United States Patent [19]

Motoda

[11] Patent Number: 4,757,890
[45] Date of Patent: Jul. 19, 1988

[54] TRAY POSITIONING ARRANGEMENT FOR DELIVERY SYSTEM

[75] Inventor: Kenro Motoda, Tokyo, Japan

[73] Assignee: Motoda Denshi Kogyo Kabushiki Kaisha, Tokyo, Japan

[21] Appl. No.: 852,354

[22] Filed: Apr. 15, 1986

[30] Foreign Application Priority Data

Apr. 19, 1985 [JP] Japan ............................ 60-84225
Apr. 19, 1985 [JP] Japan ............................ 60-84226

[51] Int. Cl.⁴ .................................. B65G 21/20
[52] U.S. Cl. .................................. 198/345; 414/225
[58] Field of Search .............. 198/339.1, 345, 346, 198/346.1, 346.2, 468.01, 468.2, 803.14, 803.13; 414/222, 225, 226; 29/33 P, 760, 784, 799

[56] References Cited

U.S. PATENT DOCUMENTS 4,371,075 2/1983 Erlichman ....................... 198/345
4,489,821 12/1984 Inaba et al. ................... 198/346.1 X
4,527,685 7/1985 Welder ........................... 198/346 X
4,626,160 12/1986 Shiomi et al. .................. 198/345 X
4,662,503 5/1987 Lycke ............................. 198/345
4,706,796 11/1987 Chambers ....................... 198/345

Primary Examiner—Robert J. Spar
Assistant Examiner—Lyle Kimms
Attorney, Agent, or Firm—Max Fogiel

[57] ABSTRACT

A tray positioning arrangement for delivery system in which a tray is formed of a casing opened at its top and an article receptacle member accommodated therein and having plural article holding pits. The article receptacle member has abutment portions and the casing has openings at its positions corresponding to the abutment portions of the article receptacle member so as to allow a positioning device directly act on the article receptacle member through the openings of the casing and the abutment portions of the article receptacle member.

6 Claims, 11 Drawing Sheets

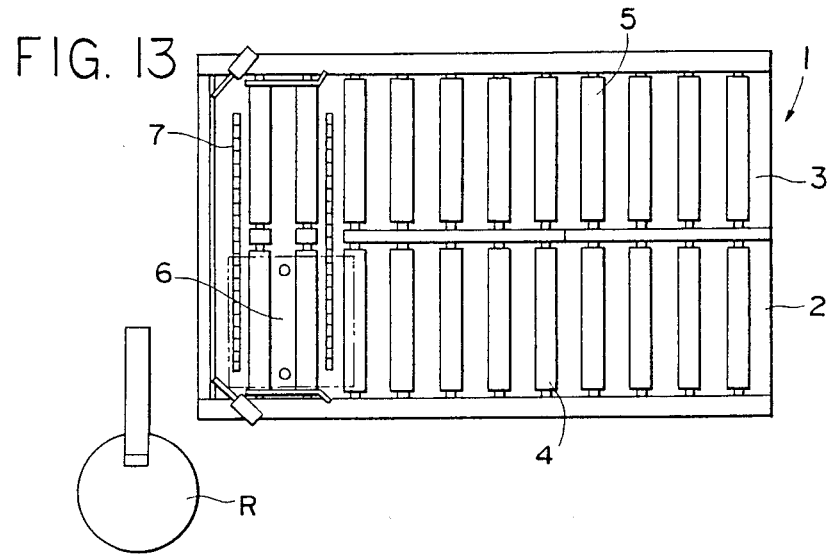
FIG. 13
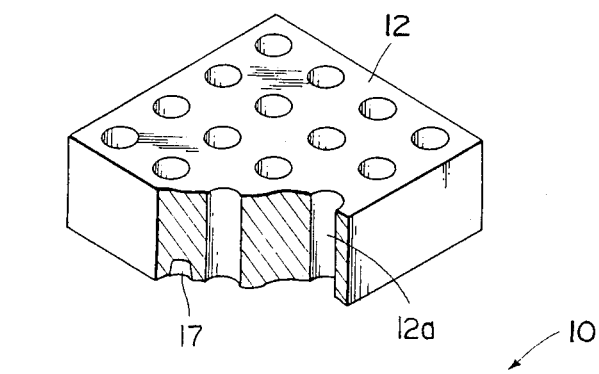
FIG. 14
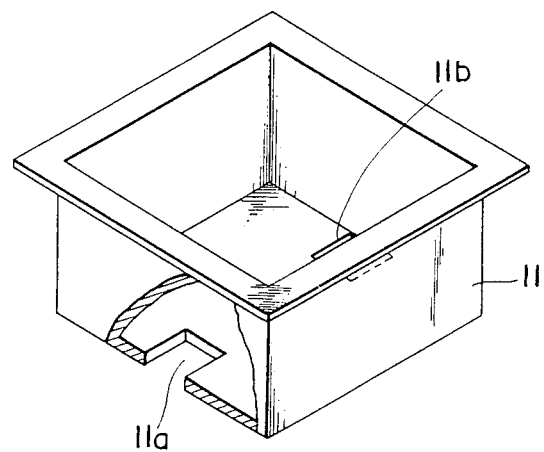

4,757,890

TRAY POSITIONING ARRANGEMENT FOR DELIVERY SYSTEM

BACKGROUND OF THE INVENTION

1. Field of the Invention

This invention relates to a tray positioning arrangement for a delivery system, and more particularly to a positioning arrangement for a tray assembly with an article receptacle member, for use in a delivery system of a processing line, an assembling line, a warehouse or the like.

2. Prior Art

In a processing line, an assembling line, a warehouse, etc., a tray having an article receptacle member is generally used to simultaneously convey and deliver a plurality of articles such as products, intermediate products, parts, tools, etc. To deliver such articles from or receive by the tray, the tray is positioned by a pressing member which is adapted to press the tray against a stopper.

However, a conventional tray assembly having an article receptacle member involves such a problem that, although the article receptacle member can be formed precisely, the shaping of a casing for accomodating the article receptacle member therein can not always have a sufficient precision. In especial, a casing made of a synthetic resinous material which is most commonly used today for the tray assembly is liable to thermal deformation, which produces a significant error in the positioning of the tray assembly. By this reason, there may possibly be caused a problem that, for example, a robot can not accurately or positively pick up the articles from the tray assembly for the delivery thereof or put the articles onto the tray assembly for the receipt therof.

OBJECTS AND SUMMARY OF THE INVENTION

It is therefore an object of the present invention to provide a tray assembly positioning arrangement for use in an article delivery system which is capable of accurately positioning the tray assembly for the delivery or receiving or processing of the articles.

In accordance with the present invention, there are provided several forms of arrangements for accurately positioning a tray assembly for use in an article delivery system which are similar in principle. The common principle is such that the positioning of the tray assembly is made through a precisely formed article receptacle member accomodated in a casing of the tray assembly.

One aspect of the invention is a tray assembly positioning arrangement for use in an article delivery system, which comprises a stopper and a pressing member oppositely disposed at an article delivering and receiving portion of the system; a tray assembly formed of a casing and an article receptacle member accomodated in the casing and adapted to hold articles therein, said casing having openings formed on the sides thereof which correspond to the stopper and the pressing member, respectively and said article receptacle member having abutment portions at the sides thereof which correspond to the openings of the casing, respectively; and positioning members provided on the respective tip ends of the stopper and the pressing member and adapted to engage with the abutment members of the article receptacle members, respectively, through the respective opeinigs of the casing.

Another aspect of the invention is a tray assembly positioning arrangement for use in an article delivery system, which comprises two sets of stopper and pressing member which are oppositely disposed, along the two directions perpendicular with each other, at an article delivery and receiving portion of the system, respectively; a tray assembly formed of a casing and an article receptacle member accomodated in the casing and adapted to hold articles therein, said casing having openings formed on the sides thereof which correspond to said two sets of stopper and pressing members, respectively and said article receptacle member having abutment portions at the sides thereof which corresponds to said openings of the casing, respectively; and positioning members provided on the respective tip ends of the stoppers and the pressing members and adapted to engage with the abutment members of the article receptacle members, respectively, through the respective opeinigs of the casing.

A still another aspect of the invention is a tray assembly positioning arrangement for use in an article delivery system, which comprises a positioning device provided beneath an article delivering and receiving portion of the delivery system and adapted to be movable up and down; a tray assembly formed of a casing and an article receptacle member accomodated in the casing and adapted to hold articles therein, said casing having at least one opening formed on the bottom side thereof and said article receptacle member having at least one abutment portion at the bottom side thereof at a position which corresponds to the opening of the casing; and a positioning member provided on the tip end of the popsitioning device and adapted to engage with the abutment member of the article receptacle member through the opeinig of the casing.

BRIEF DESCRIPTION OF THE DRAWINGS

FIG. 13 is a plan view of an entire article conveying and delivering system incorporating therein a still another form of a tray assembly positioning arrangement of the present invention;

FIG. 14 is an exploded perspective view of a tray assembly employable in the tray assembly positioning arrangement of FIG. 13;

DESCRIPTION OF PREFERRED EMBODIMENTS

Figure 1:
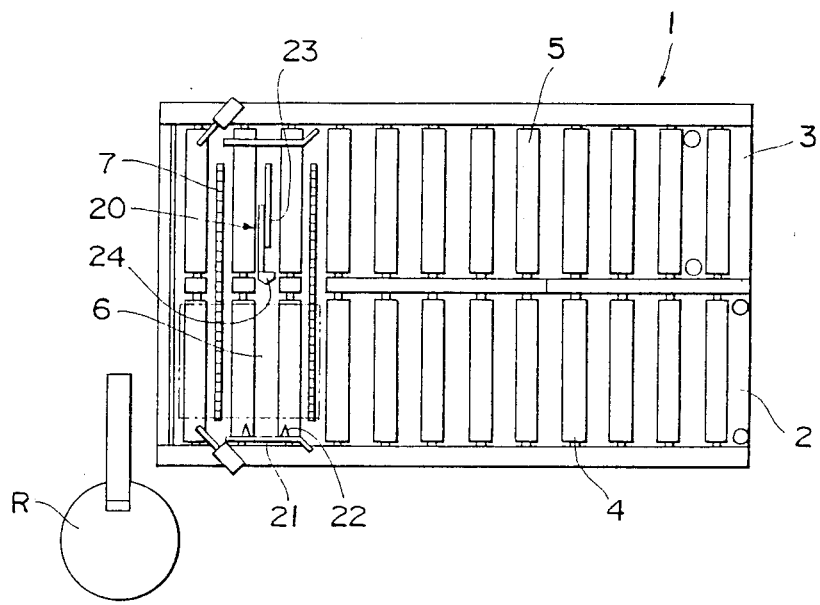
FIG. 1 is a plan view of an entire article conveying and delivering system incorporating therein one form of a tray assembly positioning arrangement of the present invention.
Figure 2:
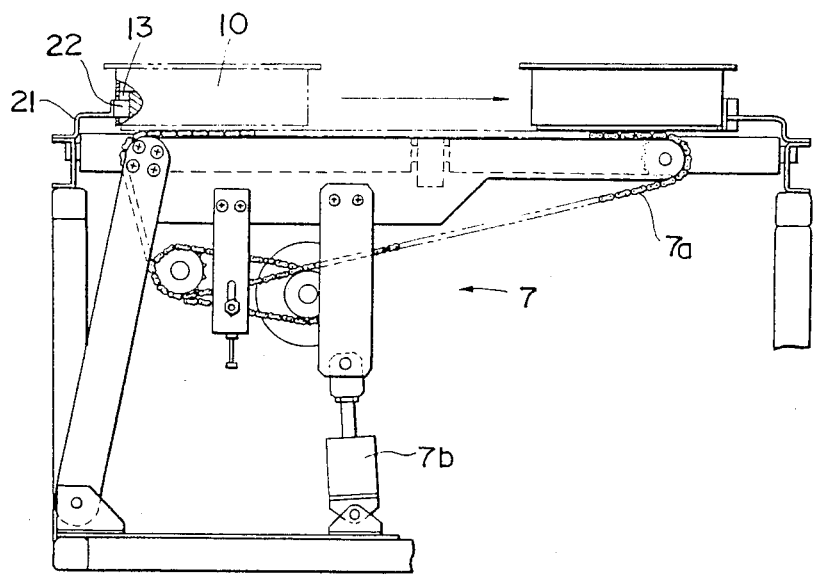
FIG. 2 is a side elevational view of a tray assembly transferring apparatus employable in the article conveying and delivering system.

The preferred embodiments of the present invention will now be described referring to the drawings.

FIGS. 1 to 8 illustrate a first preferred embodiment of the present invention.

1 is a conveying and delivering system which comprises a carrying-in line 2 and a carrying-out line 3 disposed in parallel with each other. The carrying-in line 2 and the carrying-out line 3 are each formed by a roller conveyor 4, 5, respectively. 6 designates an article delivering and receiving portion provided at the end of the carrying-in line 2. In this article delivering and receiving portion, the positioning of a tray assembly 10 as will be described in detail later is carried out for delivering and receiving articles such as products, intermediate products, parts, tools, etc. through the tray assembly 10 to and from, for example, a robot R. 7 is a transferring apparatus for transferring the tray assembly 10 from the carrying-in line 2 to the carrying-out line 3. In this transferring apparatus, a chain conveyor 7a is provided between the article delivering and receiving portion of the carrying-in line 2 to the carrying-out line 3. The chain conveyor 7a is adapted to be raised or lowered by a cylinder 7b so as to be positioned at a level in alignment with or above the surface of the roller conveyors 4 and 5 or lowered so as to be retired from the level.

Figure 3:
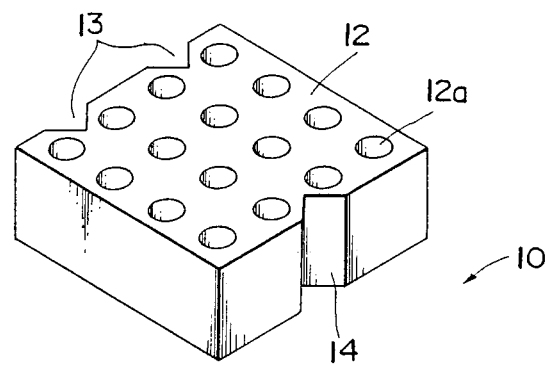
FIG. 3 is an exploded perspective view of one form of a tray assembly employable in the tray assembly positioning arrangement illustrated in FIG. 1.
Figure 3:
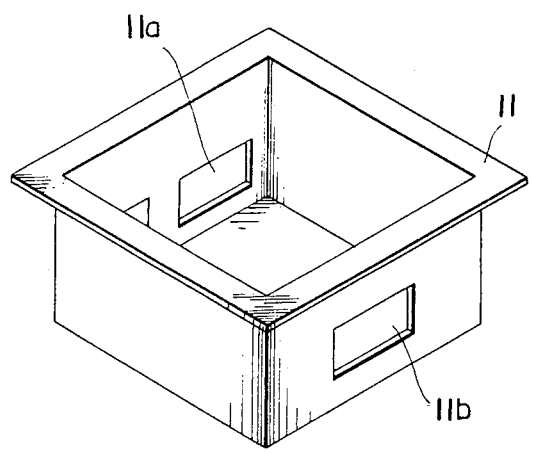
Figure 4:
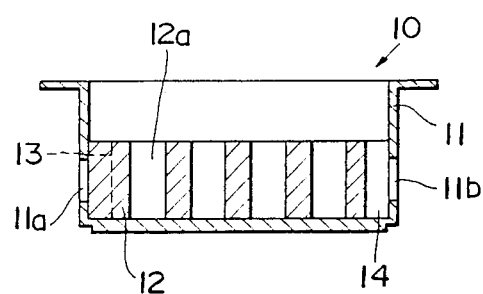
FIG. 4 is a sectional view of the tray assembly shown in FIG. 3.

The tray assembly 10 comprises a casing 11 with the top opened and an article receptacle member 12 for holding articles therein as illustrated in FIG. 3. The article receptacle member 12 is accomodated in the casing 11 as illustrated in FIG. 4. The casing 11 has elongated openings 11a, 11b at the opposite sides of the casing. In the embodiment as illustrated, the openings 11a, 11b are formed on the sides of the casing 11 which are located on the left and right sides of the carrying-in line 2. The article receptacle member 12 has a plurality of article holding pits 12a and abutment portions 13, 14 on the sides thereof corresponding to the openings 11a, 11b, respectively.

Figure 5:
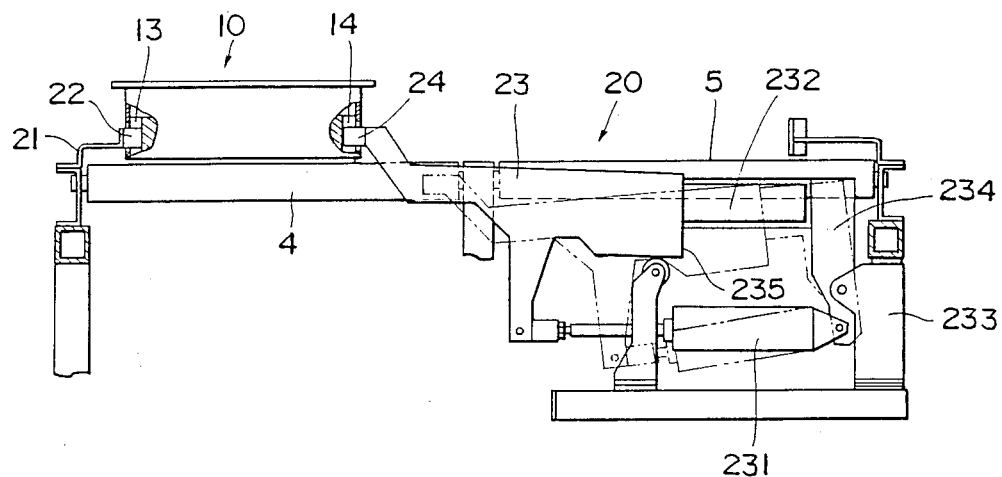
FIG. 5 is a side elevational view of the tray assembly positioning arrangement of FIG. 1.

As can be seen from FIG. 5, 20 is a positioning device comprising a stopper 21 disposed on the left side of the article delivering and receiving portion 6 and a pressing member 23 disposed on the right side thereof. A positioning member 22 provided on the inner surface of the stopper 21 is shaped so as to fit in the abutment portion 13 formed on the left side of the article receptacle 12 through the left opening 11a of the casing 11, while a positioning member 24 provided at the tip end of the pressing member 23 has a shape so as to fit in the abutment portion 14 formed on the right side of the article receptacle member 12 through the right opening 11b of the casing 11. The pressing member 23 includes the positioning member 24 as described above and a mechanism comprised of a hydraulic cylinder 231 connected to a lower portion of the positioning member 24 so as to move the positioning member 24 laterally, a guide member 232 for guiding the movement of the positioning member 24 in the horizontal direction, a swing member 234 which is swingably carried by a fixture 233 and fixed, at the upper portion thereof, to the guide member 232 and connected, at the lower portion thereof, to the hydraulic cylinder, allowing the cylinder to be swingable, and a guide roller 235 for guiding the lower portion of the positioning member 24.

With such an arrangement, when the cylinder 231 is actuated to project its shaft, the positioning member 24 is advanced and a convex portion formed at a lower portion of the positioning member 24 rides on the guide roller 235, which raises the positioning member 24 above the conveyor roller 4 while advancing the same forwardly. Consequently, the positioning member 24 engages with the abutment portion 14 of the article receptacle member 12 through the opening 11b and presses the tray assembly 10 against the stopper 21. As a result, the abutment portion 13 of the article receptacle member 12 on the stopper side thereof is caused to engage with the positioning member 22 of the stopper 21. Thus, the positioning of the tray assembly is completed. On the other hand, when the cylinder 231 is actuated so as to pull its shaft, the positioning member 24 is retired, causing a concave portion to engage with the guide roller 235. As a result, the positioning member 24 is lowered to below the conveyor roller 4 while being retired. Then, the tray assembly is allowed to be transferred to the carrying-out line 5.

The arrangement of the abutment portions 13, 14 of the article receptacle member of the tray assembly 10 and the positioning members 22, 24 of the stopper 21 and the pressing member 23 may be in various modes.

Figure 6A:
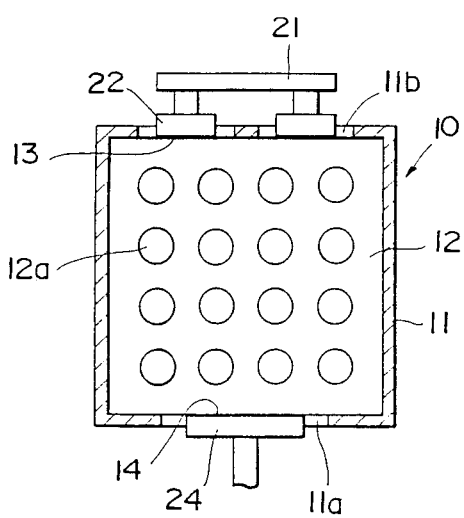
FIGS. 6(a) and 6(b) illustrate an arrangement for effecting the positioning in one direction.
Figure 6B:
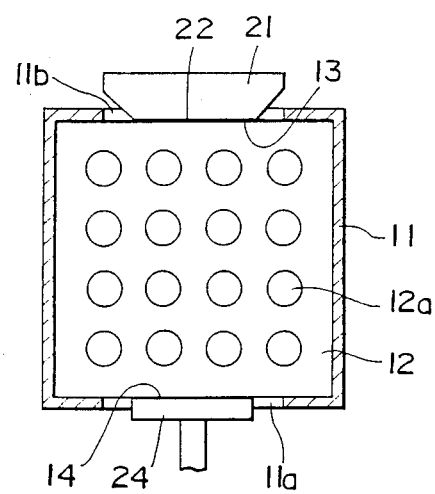
Figure 7A:
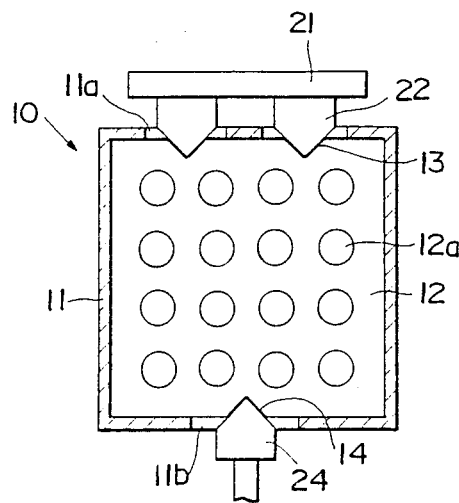
FIGS. 7(a), 7(b), 7(c) and 7(d) illustrate an arrangement for effecting the positioning in two directions.
Figure 7B:
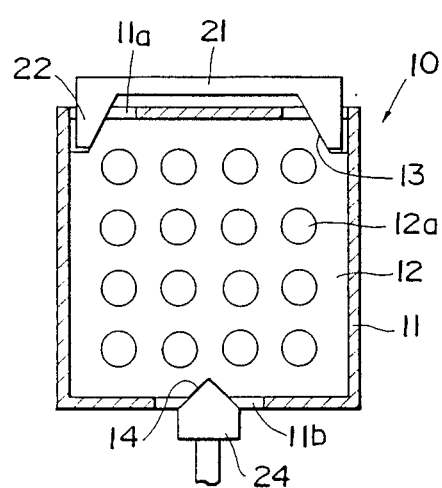
Figure 7C:
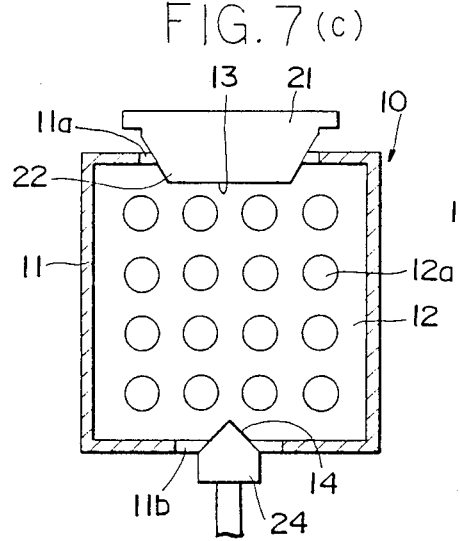
Figure 7D:
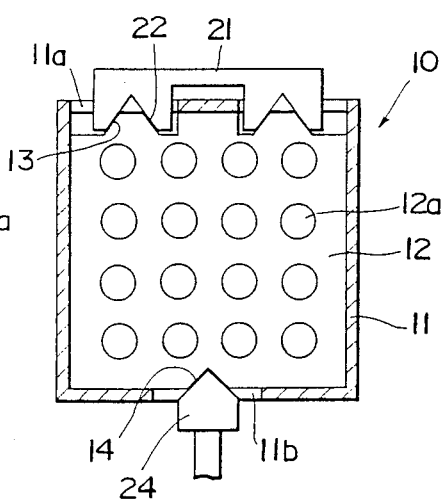

For example, in order to effect the positioning of the tray assembly in either one of the longitudinal direction of the conveying and delivering system and the direction transverse thereto, the abutment portions 13, 14 and the positioning members 22, 24 may be formed in flat configurations as illustrated in FIG. 6. In this case, there may be employed a two-point positioning mode wherein the stopper 21 and the pressing member 23 each have a single positioning member 22, 24, respectively (FIG. 6(a)), a three-point positioning mode where the positioning member 22 of the stopper 21 is divided into two (FIG. 6(b)), or a four-point positioning mode wherein each of the positioning member 22 of the stopper 21 and the positioning member 24 of the pressing member 23 is divided into two (not shown). In this connection, it is to be noted that if the engagement between the abutments 13, 14 and the positioning members 22, 24 may face-to-face engagement, the accuracy of the positioning can be enhanced.

In order to effect the positioning of the tray assembly 10 in both the longitudinal direction and the transversal direction, the abutment portions 13, 14 may be shaped in concaved configuration and the positioning members 22, 24 may have complementary tapered convex shape, for example, as illustrated in FIG. 4 and FIGS. 7(a) to (d). In these cases, there may also be employed the two-point positioning mode, three-point positioning mode, or four-point positioning mode. Of course, one of the abutment portions on the side of the stopper 21 or on the side of the pressing member 23 may be in flat engagement with the corresponding positioning member 22 or 24. The shapes of the abutment portions 13, 14 and the positioning members 22, 24 for effecting concave-to-convex engagement is not limited to those as illustrated in FIGS. 7(a) to (d).

Figure 8A:
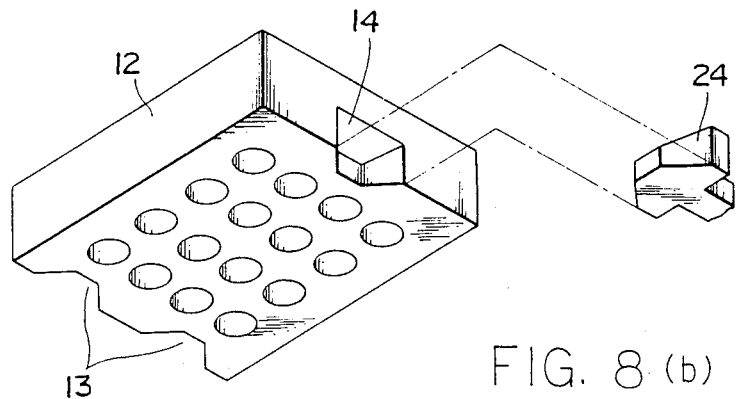
FIGS. 8(a) and 8(b) illustrate an arrangement for effecting the positioning in three directions.
Figure 8B:
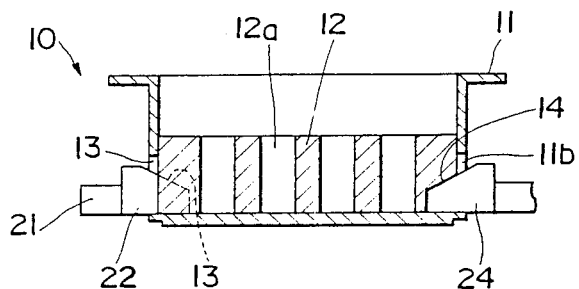
Figure 9:
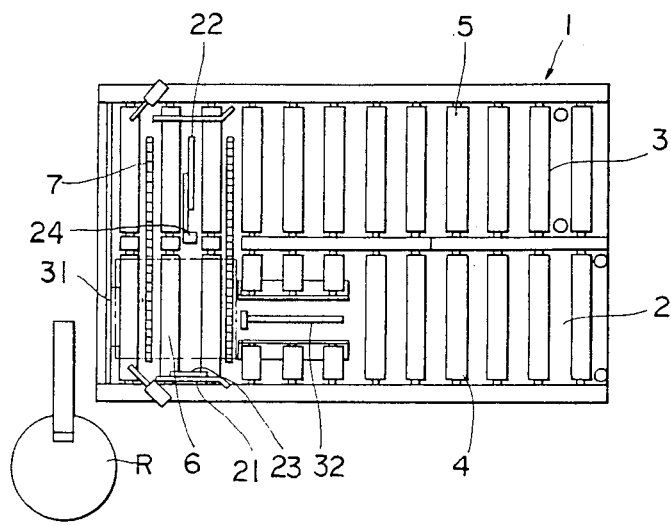
FIG. 9 is a plan view of an entire article conveying and delivering system incorporating therein another form of a tray assembly positioning arrangement of the present invention.
Figure 10:
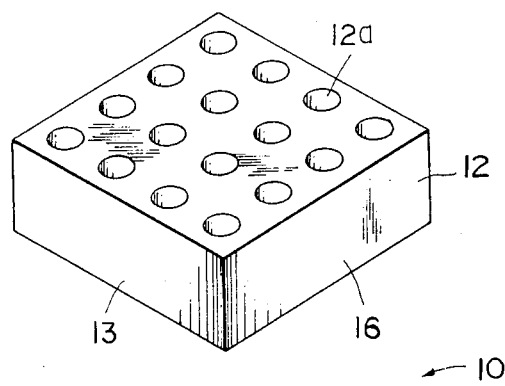
FIG. 10 is an exploded perspective view of a tray assembly employable in the tray assembly positioning arrangement of FIG. 9.

In order to attain three-directional positioning of the tray assembly 10, i.e., in the londitudinal direction, the transversal direction and the vertical direction, the abutment portions 13, 14 and the positioning members 22, 24 may be formed in concave and convex configurations, respectively, each having a slanting top face and tapered side faces as illustrated in FIG. 8(a) and FIG. 8(b). In this case, there may also be employed a two-point positioning mode, a three-point positioning mode, or four-point positioning mode. The positioning of the tray assembly 10 in the vertical direction may be effected by moving both the article receptacle member 12 and the casing conjointly or by moving only the article receptacle member 12.

The operation of the present embodiment will now be described.

When the tray assembly 10 is conveyed on the carrying-in line of the conveying and delivering system 1 to the article delivering and receiving portion 6 by the roller conveyor 4, the roller conveyor 4 is stopped and simultaneously the pressing member 23 is actuated. The pressing member 23 is disposed on the right side of the article delivering and receiving portion 6 so as to be opposite to the stopper 21 which is disposed on the left side of the article delivering and receiving portion 6. Therefore, when the pressing member 23 is actuated and the positioning member 24 thereof is raised above the roller 4, the pressing member 23 abuts against the right abutment portion 14 of the article receptacle member 12 through the opening 11b and presses the tray assembly 10 against the stopper 21. Consequently, the positioning member 22 of the stopper 21 is brought into engagement with the left abutment portion 13 of the article receptacle member 12 through the opening 11a. Thus, the one-directional, two-directional or three-directional positioning of the tray assembly 10 at the article delivering and receiving portion 6 is attained.

Then, the robot R carries out required operation such as taking the articles out of the pits 12a of the article receptacle member 12 or putting the articles into the pits 12a. Upon completion of the article delivering or receiving operation by the robot R, the pressing member 23 is actuated to let the positioning member 24 be lowered to below the roller 4 while being retreated. Thereafter, the transferring apparatus 7 is actuated to move the tray assembly 10 in the direction perpendicular to the carrying-in line 2 to transfer the assembly 10 onto the roller conveyor 5 of the carrying-out line 3.

The present embodiment includes the following modifications:

(1) The stopper and the pressing member are disposed oppositely in the longitudinal direction of the line;
(2) The stopper is formed retractile;
(3) The article receptacle member is formed in, for example, such a shape having a planar plate and legs;
(4) The abutment portions and the positioning members are formed in shapes different from those as specified in the figures; and
(5) The positioning arrangement is adapted to be used in a series-type conveying and delivering system.

FIGS. 9 to 12 illustrate a second embodiment of the present invention, wherein two sets of the stoppers each having a positioning member and the pressing members each having a positioning members are provided along the longitudinal direction of the conveying line and the transversal direction, respectively, to effect the two directional positioning of the tray assembly.

The tray assembly 10 employable in the present invention comprises a casing 11 opened at the top thereof and an article receptacle member 12 as in the foregoing embodiment, but it differs from that of the foregoing embodiment in that the casing has openings 11a, 11b, 11c and 11d formed on the four sides thereof, respectively, and the article receptacle member 12 has, its four sides, abutment portions 13, 14, 15 and 16, respectively, corresponding to the openings 11a to 11d of the casing 11, respectively.

Figure 11:
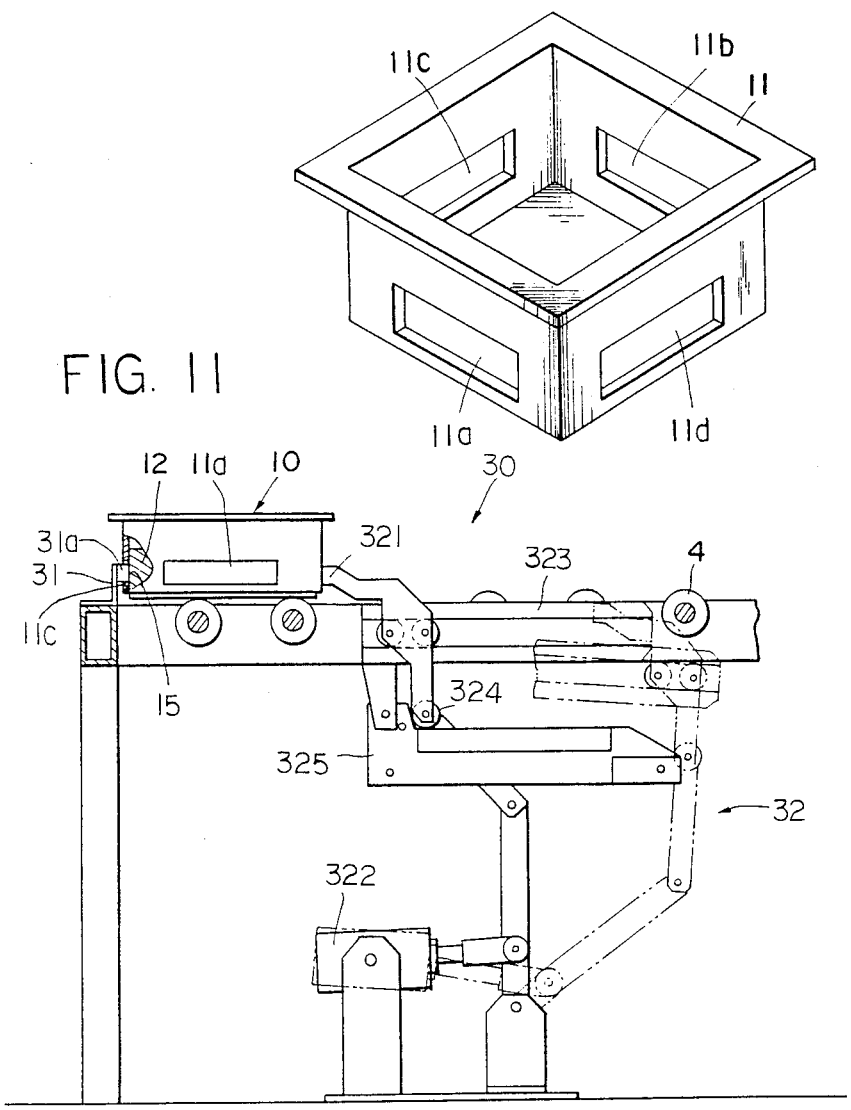
FIG. 11 is a side elevational view of the tray assembly positioning arrangement for carrying out the positioning of the tray assembly in the conveying direction of the article conveying and delivering system.
Figure 12:
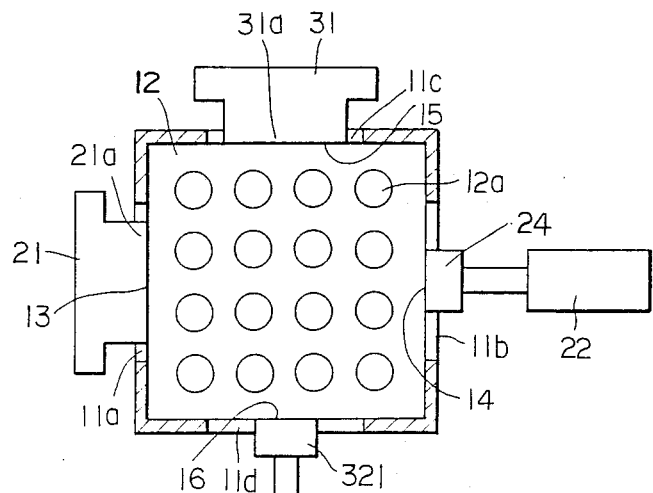
FIGS. 12(a), 12(b) and 12(c) show different modes of arrangement for effecting the tray assembly positioning.
Figure 12:
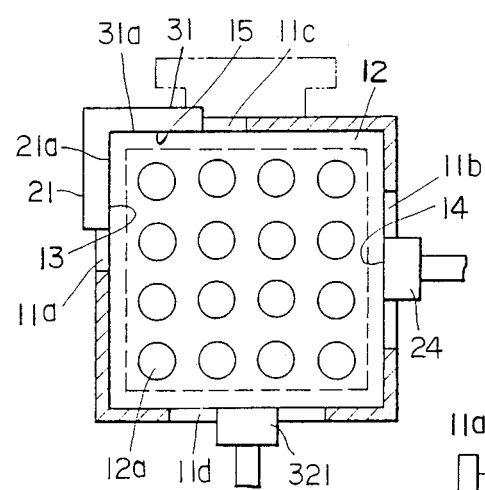
Figure 12:
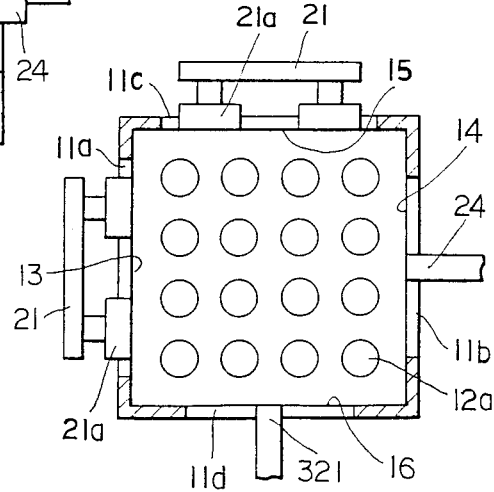
Figure 15:
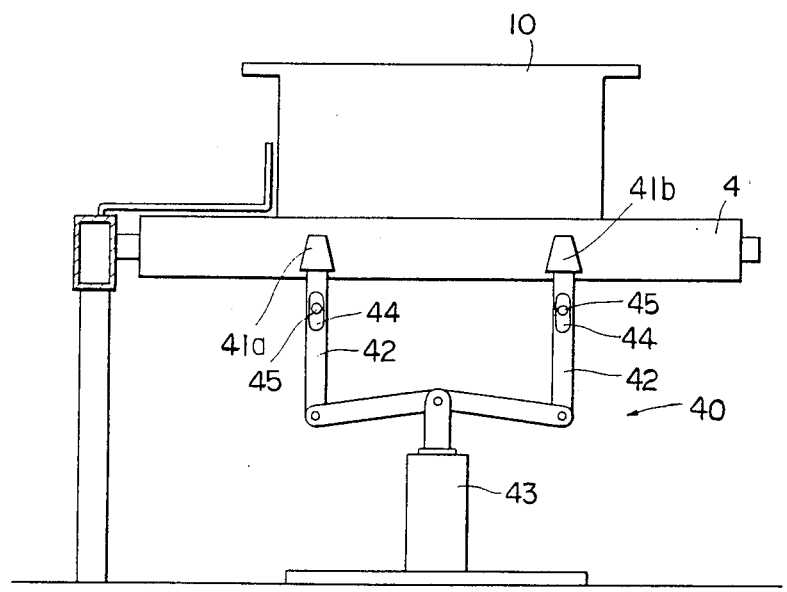
FIG. 15 is a side elevational view of the tray assembly positioning arrangement of FIG. 13.

30 is a positioning devive for positioning the tray assembly 10 in the longitudinal direction of the conveying and delivering system 1. This positioning device comprises a stopper 31 disposed at a forward end portion of the article delivering and receiving portion 6 and a pressing member 32 disposed at a rear end portion of the article delivering and receiving portion 6. As illustrated in FIG. 11, the stopper 31 has a positioning member 31a which is so formed that it may directly abut against or engage with the forward abutment portion 15 of the article receptacle member 12 through the opening 11c of the casing 11. The pressing member 32 has a positioning member 321 which abuts against or engage with the rear abutment portions 16 of the article receptacle member 12 through the opening 11d. The pressing member 32 further comprises a hydraulic cylinder 322 which rotates the positioning member 321 through a link, a guide member 323 for guiding the positioning member 321 in the horizontal direction, and a support member 325 which rotatably supporting the guide member 323 and slides the junction portion of the positioning member 321 and the link through a roller 324.

With this arrangement, when the cylinder 322 is actuated to pull its shaft, the positioning member 321 is advanced and raised above the conveyor roller 4. Consequently, the positioning member 321 presses the rear abutment portion 16 of the article receptacle member 12 through the opening 11d towards the stopper 31. As a result, the positioning member 31a of the stopper 31 is brought into engagement with the forward abutment portion 15 through the opening 11c. Thus, the positioning of the tray assembly 10 in the longitudinal direction is attained. On the other hand, when the cylinder 321 is actuated to project the shaft, the positioning member 321 is retired while being guided by the guide member 323 and lowered to below the conveyor roller 4 while drawing an arc as a whole.

The positioning device for positioning the tray assembly in the transverse direction to the length of the conveying and delivering system is substantially the same as that of the first embodiment as illustrated in FIG. 5.

The operation of the present embodiment will now be described.

When the tray assembly 10 is conveyed on the carrying-in line 2 to the article delivering and receiving portion by the roller conveyor 4, the roller conveyor 4 is stopped and the pressing memebrs 22 and 32 are actuated. Upon actuation of the pressing member 32, the positioning member 321 is raised above the roller 4 and presses the rear abutment portion 16 of the article receptacle member 12, so that the positioning member 31a of the stopper 31 is engaged with the forward abutment portion 15. The positioning of the tray assembly 10 in the longitudinal direction is thus attained. When the pressing member 22 is actuated, the positioning member 221 is raised above the roller 4 and presses the right abutment portion 14 of the article receptacle member 12. As a result, the positioning member 21a of the stopper 21 is brought into engagement with left abutment portion 13 of the article receptacle member 12, whereby the positioning of the tray assembly 10 in the transversal direction is attained. Thus, two-directional positioning is attained and thereafter the robot R operates to deliver the articles from or to the pits 12a of the article receptacle member 12 of the tray assembly 10.

After completion of the article delivery by the robot R, the pressing members 22 and 32 are actuated to lower the positioning member 221 and 321 to below the roller 4, respectively. Then, the roller conveyor 4 is slightly reversed to release the engagement of the positioning member 31a of the stopper 31 from the opening 11c. Thereafter, the transferring apparatus 7 and the roller conveyor 5 of the carrying-out line 3 is actuated to carry out the tray assemblies 10 sequentially in the direction of arrow mark in FIG. 9.

In a modification of the present invention, the positioning members 21a and 221 and/or the positioning members 31a and 321 and the abutment portions 13 and 14 and/or the abutment portions 15 and 16 may be formed in such shapes which enable positioning of the tray assembly 10 in the vertical direction. The stoppers 21 and 31 may be retractile. In this case, the retirement of the tray assembly 10 at the time of carrying-out of the tray assembly 10 may be omitted and the present tray positioning arrangement may be applicable to a series-type conveying and delivering system. Further, the stoppers 21 and 31 may be formed integral with each other as illustrated in FIG. 12(b) or the abutment portion may be divided as illustrated in FIG. 12(c).

FIGS. 13 to 18 illustrate third embodiment of the present invention, wherein a positioning device is provided under the article delivering and receiving portion and it is adapted to move up and down to engage with and disengage from an abutment portion or portions formed on the bottom of the article receptacle member of the tray assembly through a corresponding opening or openings formed in the bottom of the casing of the tray assembly.

FIG. 13 is a plan view of the present embodiment. The arrangement of the conveying and delivering system 1 and the transferring apparatus is identical with that of the foregoing embodiments.

The tray assembly 10 employable in the present embodiment comprises a casing 11 opened at the top thereof and an article receptacle member 12 accomodated in the casing as in the foregoing embodiments. As illustrated in FIG. 14, the casing 11 of the present embodiment as illustrated, however, has openings 11a and 11b on its bottom at the forward end portion and the rear end portion, respectively, and the article receptacle member 12 has abutments 17 and 18 on the bottom thereof at the forward portion and the rear portion, respectively.

40 is the positioning device which is disposed beneath the article delivering and receiving portion 6. The positioning device 40 comprises two positioning members 41a, 41b provided so as to correspond to the abutment potions 17 and 18, respectively and adapted to appear and disapper, passing through the rollers 4, links 42 each having, at the respective tip ends, the positioning members 41a and 41b, respectively, and adapted to move up and down according to the operation of a cylinder 43, and guide rods 45 each fitted in elongated slots 24 formed in the links 42, respectively, for guiding the links 42 vertically. The mechanism for bringing the positioning members 41a, 41b into operative positions or inoperative positions is not limited to that as illustrated.

Figure 16:
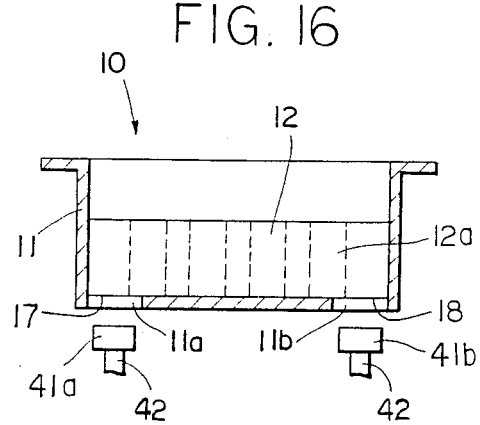
FIG. 16 shows one mode of arrangement for effecting the tray assembly positioning.

The shapes of the abutment portions 13 and 14 of the article receptacle member 12 and the positioning members 41a, 41b of the positioning device 40 are selected according to the modes of the tray assembly positioning. More particularly, in order to effect the positioning only in the vertical direction, the shapes of the abutment members 13 and 14 and the positioning members 41a and 41b may be formed flat because flat engagement therebetween is sufficient (FIG. 16).

Figure 17A:
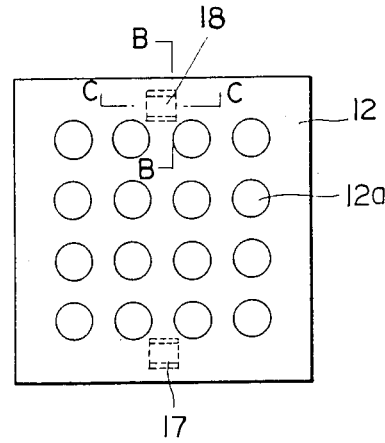
FIGS. 17(a), 17(b) and 17(c) are a plan view and fragmentary sectional views of another mode of arrangement for effecting the tray assembly positioning, respectively.
Figure 17B:
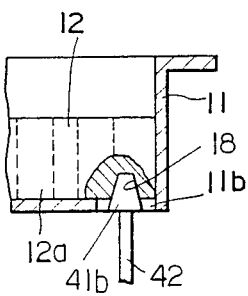
Figure 17C:
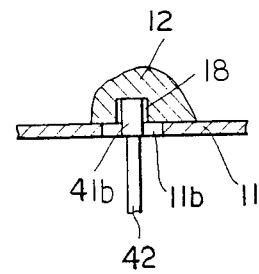
Figure 18A:
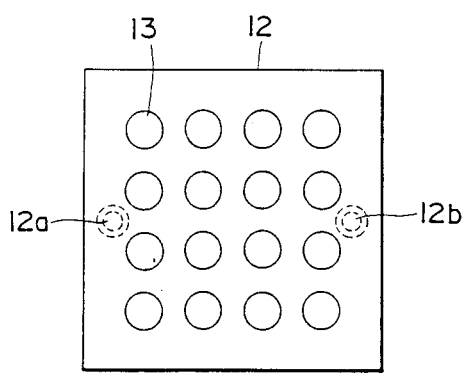
FIGS. 18(a) and 18(b) are a plan view and a side elevational view of a still another mode of arrangement for effecting the tray assembly positioning, respectively.
Figure 18B:
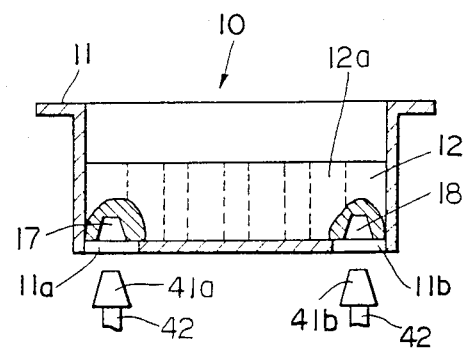
Figure 19A:
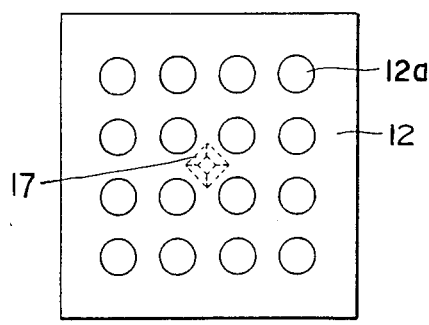
FIGS. 19(a) and 19(b) are a plan view and a side elevational view of a still another mode of arrangement for effecting the tray assembly positioning, respectively.
Figure 19B:
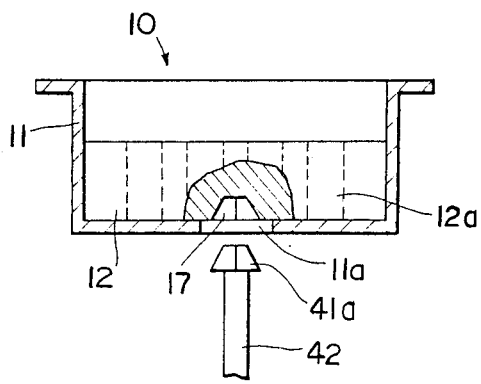

In order to effect two-directional positioning, i.e., in the vertical direction and in the longitudinal direction of the conveying and delivering system or the direction transverse thereto, the abutments 17 and 18 and the positioning members 41a and 41b may be formed, for example, in such shapes each having a top positioning face and side positioning faces in either one of the longitudinal and transversal directions as illustrated in FIGS. 17(a), (b) and (c).

In order to effect three-directional positioning, i.e., in the vertical direction, the longitudinal direction and the transversal direction, the shapes of the abutments 17 and 18 and the positioning members 41a and 41b may, for example, be a truncated conical or pyramid shape having positioning faces in the vertical direction and in the longitudinal and transversal directions as illustrated in FIGS. 18(a) and 18(b) and FIGS. 19(a) and 19(b). In this case, if the truncated conical shape is adopted, a single abutment portion 17 and a single positioning member 41a will suffice to attain the three-directional positioning.

Figure 20:
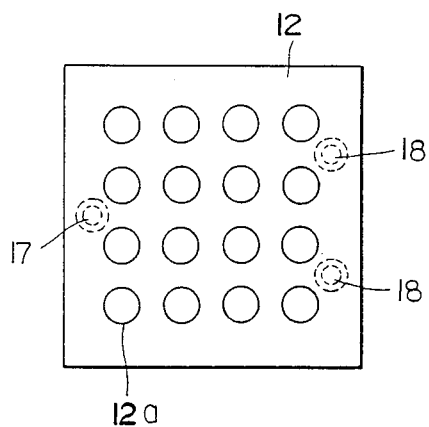
FIG. 20 is a plan view of a further mode of arrangement for effecting the tray assembly positioning.
Figure 21:
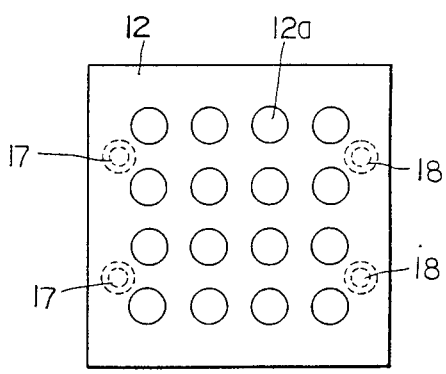
FIG. 21 is a similar plan view of a still further mode of arrangement for effecting the tray assembly positioning.

If a plurality of abutment portions and positioning portions are provided, they may, for example, be disposed as illustrated in FIGS. 20 and 21. In this case, the accuracy of the positioning can be enhanced.

The operation of the present invention will now be described.

When the tray assembly 10 is conveyed on the carrying-in line 2 of the conveying and delivering system 1 to the article delivering and receiving portion 6 by the roller conveyor 4, the roller conveyor 4 is stopped and at the same time, the positioning device 40 is actuated. Since the positioning device 40 is disposed beneath the article delivering and receiving portion 6, the convex positioning members 41a and 41b are raised, upon actuation of the positioning device 40, above the roller 4 and abut against or engage with the concave abutment portions 17 and 18, respectively to effect the tree directional positioning.

Then, the article delivering or receiving operation is carried out by the robot R. After completion of the robot operation the positioning members 41a and 41b are lowered to below the roller 4. Thereafter, the transferring apparatus 7 is actuated to move the tray assembly 10 in the direction perpendicular to the carrying-in line 2 and transfer the same onto the roller conveyor 5 of the carrying-out line 3.

The third embodiment of the present invention includes the following modifications:

(1) The shapes of the abutment portions and the positioning members may be formed differently from those as illustrated. For example, the abutment portions may be convexed and the positioning members may be concaved;

(2) The abutment portions are formed diagonal and the positioning members are moved diagonally; and (3) The tray positioning arrangement of the present embodiment is applied to a series-type conveying and delivering system.

I claim:

1. A tray assembly positioning arrangement for use in an article delivery system, which comprises a stopper and a pressing member oppositely disposed at an article delivering and receiving portion of the system; a tray assembly formed of a casing and an article receptacle member accomodated in the casing and adapted to hold articles therein, said casing having openings formed on the sides thereof which correspond to the stopper and the pressing member, respectively and said article receptacle member having abutment portions at the sides thereof which correspond to the openings of the casing, respectively; and positioning members provided on the respective tip ends of the stopper and the pressing member and adapted to engage with the abutment portions of the article receptacle member, respectively, through the respective openings of the casing.

2. A tray assembly positioning arrangement for use in an article conveying and delivering system as claimed in claim 1, wherein said abutment portions formed on the article receptacle member and the positioning members provided on the stopper and the pressing member, respectively, are shaped in a form which allows the positioning in either one of the longitudinal direction of the conveying and delivering system and the direction transverse thereto.

3. A tray assembly positioning arrangement for use in an article conveying and delivering system as claimed in claim 1, wherein said abutment portions formed on the article receptacle member and the positioning members provided on the stopper and the pressing member, respectively, are shaped in a form which allows the positioning in both the longitudinal direction of the conveying and delivering system and the direction transverse thereto.

4. A tray assembly positioning arrangement for use in an article conveying and delivering system as claimed in claim 1, wherein said abutment portions formed on the article receptacle member and the positioning members provided on the stopper and the pressing member, respectively, are shaped in a form which allows the positioning in the longitudinal direction of the conveying and delivering system, the direction transverse thereto and the vertical direction.

5. A tray assembly positioning arrangement for use in an article conveying and delivering system as claimed in claim 1, wherein the positioning member of the stopper is divided.

6. A tray assembly positioning arrangement for use in an article delivery system, which comprises two sets of stoppers and pressing members which are oppositely disposed, along the two directions perpendicular with each other, at an article delivery and receiving portion of the system, respectively; a tray assembly formed of a casing and an article receptacle member accomodated in the casing and adapted to hold articles therein, said casing having openings formed on the sides thereof which correspond to said two sets of stoppers and pressing members, respectively and said article receptacle member having abutment portions at the sides thereof which corresponds to said openings of the casing, respectively; and positioning members provided on the respective tip ends of the stoppers and the pressing members and adapted to engage with the abutment portions of the article receptacle member, respectively, through the respective openings of the casing.

* * * * *